United States Patent [19]

Nishimura

[11] 3,737,994
[45] June 12, 1973

[54] METHOD FOR PRODUCING A MECHANICAL STRESS DETECTING DEVICE

[75] Inventor: Kazuo Nishimura, Tokyo, Japan
[73] Assignee: Kabushiki Kaisha Meidensha, Tokyo, Japan
[22] Filed: May 15, 1972
[21] Appl. No.: 253,598

Related U.S. Application Data
[62] Division of Ser. No. 89,175, Nov. 13, 1970.

[30] Foreign Application Priority Data
Dec. 3, 1969 Japan.............................. 44/96924
Oct. 14, 1970 Japan............................. 45/90209

[52] U.S. Cl. .................. 29/606, 29/602, 29/609, 73/DIG. 2, 148/103, 336/20, 336/218, 336/234
[51] Int. Cl. .............................................. H01f 7/06
[58] Field of Search .................. 29/602, 609, 606; 336/20, 218, 234; 73/141 A, DIG. 2; 317/143; 148/103, 108

[56] References Cited
UNITED STATES PATENTS
2,895,332 7/1959 Dahle et al. ................. 73/DIG. 2 X
3,158,516 11/1964 Walter et al. ........................ 148/108
3,307,405 3/1967 Stucki ........................... 73/DIG. 2 X Primary Examiner—Charles W. Lanham
Assistant Examiner—Carl E. Hall
Attorney—Hans Berman and Kurt Kelman

[57] ABSTRACT

Herein disclosed is a method for manufacturing a mechanical stress detecting device using a block of laminated magnetic plates and a pair of non-magnetic side plates between which the block of the laminated magnetic plates is tightly interposed. The block of the magnetic plates and the side plates attached thereto have formed therein four apertures extending from one of the side plates to the other and symmetrically spaced apart from each other at an angle of about 90°, the apertures being located in a manner to have the phantom lines joining diametrically opposed pairs of the apertures are angled at about 45° to the direction in which a mechanical stress is applied to the block of the laminated magnetic plates. The detecting device is produced by heating the block of the laminated magnetic plates tightened by the side plates to the Curie point with a magnetizing coil passed through one pair of apertures in the block and cooling the block of the laminated plates through a predetermined range of temperature with the magnetizing coil kept energized, whereby a magnetic core having a monoaxial magnetoanisotropy is obtained. The magnetizing coil is then removed and a detecting coil is passed through another pair of apertures in the block.

3 Claims, 10 Drawing Figures

PATENTED JUN 12 1973 3,737,994

METHOD FOR PRODUCING A MECHANICAL STRESS DETECTING DEVICE

This is a divisional application from the applicant's copending application Ser. No. 89,175 filed Nov. 13, 1970.

The present invention relates generally to a method for producing a device for detecting and measuring a mechanical stress or pressure and, more particularly, to a method for producing device which is adapted to convert a mechanical stress or pressure into a corresponding variation in an electrical quantity representing a magneto-strictive force in a magnetic material for quantitatively detecting the mechanical stress or pressure. The device of this nature will prove advantageous for the measurement of various weights and mechanical pressures in numerous quarters of the industry.

The device to which the present invention is directed is basically of the type which is disclosed in the Japanese Pat. Publication No. 31–495 issued under the date of Jan. 27, 1947. The device described therein compRises a plurality of closely laminated magnetic plates and a pair of side plates which are securely mounted on both sides of the block of the laminated magnetic plates by means of bolts. The magnetic plates and the sides plates which are thus integral with the block of the magnetic plates form an integral magnetic core. Four separate apertures extend through the magnetic plates and the side plates. The apertures are spaced at 90° from each other so that there are two pairs of apertures which are opposite to each other. An exciting coil is passed through a first pair of opposite apertures and a detecting coil is passed through a second pair of opposite apertures. The exciting coil and the detecting coil are thus in a crossing relationship on both sides of the magnetic core. The exciting coil is connected to a source of an ac power. For measurement of a mechanical stress or pressure, the load is applied to the magnetic core in a direction perpendicular to the direction in which the magnetic plates are laminated, viz., at an angle of about 45° to the directions in which the exciting and detecting coils cross each other, whereby a signal having a magnitude which is indicative of the load applied to the magnetic core is produced from the detecting coil.

The magnetic core to be used in this type of detecting device is generally made of a material which is magnetically non-directive or which is free from a residual strain, because of the fact that the magnetic characteristics of the core are otherwise subject to impairment by the residual strain in the laminated magnetic plates *per se* or by the residual strain which is induced in the process of laminating the magnetic plates. If, in this instance, a magnetically directive material is used, then the resultant magnetic core is most responsive to the applied load in the direction in which the direction of the spontaneous magnetization or of the monoaxial magnetic anisotropy is 45° to the direction of the load applied. This phenomenon can be ascertained and proved theoretically. The present invention thus contemplates significantly increasing the apparent detection sensitivity in the quantitative detection of a mechanical stress or pressure through utilization of such phenomenon.

The material to form the magnetic core is usually produced in two different methods, one being the cold rolling and the other being the cooling in a magnetic field.

To produce the magnetic core material in the cold rolling method, it is required that the monoaxial magneto-anisotropic material have a sufficient adaptability to rolling. Moreover, the cold-rolled magnetic material is so thin that the magnetic core made up of the laminated plates of such thin material can not be free from deformation due to application of a load in a direction perpendicular to the direction in which the plates are laminated on each other. Where a pair of side plates are secured to both sides of the block of the laminated magnetic plates by means of bolts or other suitable tightening means, the magnetic core is subject to a mechanical distorsion resulting from the pressure exerted from the side plates. If it is desired to remove such mechanical distorsion by heating the magnetic core, the monoaxial magnetic anisotropy which haS been attained through coil rolling is impaired and, as a result, the magnetic core is no longer acceptable for use in the detecting device of the type to which the present invention appertains.

When, on the other hand, a certain type of magnetic material such as for example a sufficiently deoxidized permalloy containing about 63 percent nickel has been heated in a magnetic field to a temperature approximating the Curie point, say about 600° C, is cooled down through a range of about 250° C in the magnetic field, then the crystal magnetic anisotropy of the cubic crystals is caused to disappear if the magnetic material is cooled at a selected rate such as about 10° C/hour and a monoaxial magnetic anisotropy is induced in the direction of the magnetic field which has been built up at the initial elevated temperature. As the cooling proceeds, the directions of the magnetism in the individual magnetic domains are oriented and fixed in the direction of the magnetic field in which the magnetic material is placed. Where a plurality of magnetic plates of the thus produced monoaxial magneto-anisotropic material are laminated into a unitary block and a pair of side plates are mounted under pressure on both sides of the block of the laminated plates so as to form an integral magnetic core, a mechanical strain is Produced in the magnetic core similarly to the magnetic core made up of laminated plates manufactured by cold rolling. This difficulty will be avoided if a core having Previously laminated magnetic plates which are integral with side plates is cooled in a magnetic field so as to produce a magnetic core of monoaxial magneto-anisotropic nature. For this purpose, the magnetic field may be produced in such a manner that the magnetic core having the laminated plates secured to the side plates is placed in a heating over which is surrounded by a magnetizing coil and that the magnetizing coil is excited with an intense electric current. Since, in this instance, the magnetic core has a considerably large thickness, the magnetizing coil should be excited with a practically inoperably high electric current so as to overcome the demagnetizing coefficient of the core. If, to avoid this, the magnetic plates separated From each other are cooled in the magnetic field and are thereafter laminated upon one another, the performance characteristics of the resultant magnetic plates will be impaired Partly because of the mechanical distorsion of the magnetic core due to the tightening pressure from the side plates and partly because of the structural sensitivity of the magnetism of the material used. If, furthermore, the magnetic plates are laminated and the side plates are secured thereto by the use of a suitable adhesive material without using bolts, the resultant magnetic core will be invariably subject to mechanical distorsion due to the deforming stress to be exerted when the adhesive material is being set and, as such, the problem as hereinbefore pointed out is still maintained.

In order to solve this and other problems, I have proposed in the aforesaid copending application a device which comprises a magnetic core including a block of a plurality of closely laminated magnetic plates and a pair of side plates which are securely mounted on both sides of the block. The magnetic core has formed therein four apertures extending through the block of the magnetic plates in a direction which is substantially perpendicular to the plates and spaced apart substantially symmetrically from each other at an angle of about 90°. These apertures are disposed in such a manner that phantom lines joining the respective diametrically opposed pairs of the apertures are angled at about 45° to a direction in which a load to be detected is applied to the magnetic core. The detecting device further comprises an exciting coil which is passed through one of the pairs of the apertures and which is connected to a source of an ac power and a detecting or output coil which is passed through the other of the pairs of the apertures. These exciting and detecting coils are positioned in a manner to cross each other on the outer surface of either of the side plates at an angle of about 45° to the direction of the load to be applied to the magnetic core. This magnetic core is bestowed with a monoaxial magnetic anistropy which has been established by cooling the magnetic core from an elevated temperature through a certain range in a magnetic field.

The present invention is thus concerned with a method which is specifically adapted to produce the detecting device having the above outlined general construction. The method according to the present invention generally comprises the steps of laminating a plurality of magnetic plates upon each other into an integral block, securely mounting a pair of side plates to both sides of the block by means of fastening means for forming an integral magnetic core, the core having formed therein four apertures extending through the magnetic core in a direction substantially perpendicular to the laminated plates and spaced apart symmetrically from each other at an angle of about 90°, the magnetic core, passing a magnetizing coil through one of the pairs of the apertures, the magnetizing coil being connected to a source of dc power, placing the resultant magnetic core in a hot atmosphere, reducing the temperature of the hot atmosphere through a predetermined range and at a predetermined rate while energizing the magnetizing coil from the source of dc power for establishing a monoaxial magnetic anisotripy in the magnetic core, removing the magnetic core from the hot atmosphere, removing the magnetizing coil from the magnetic core, passing an exciting coil through a first one of the pairs of the apertures and passing a detecting coil through a second one of the pairs of the apertures.

Other objects, features and advantages of the method therefor according to the present invention will be more clearly understood upon perusal of the following description taken in conjunction with the accompanying drawings, in which.

Figure 1:
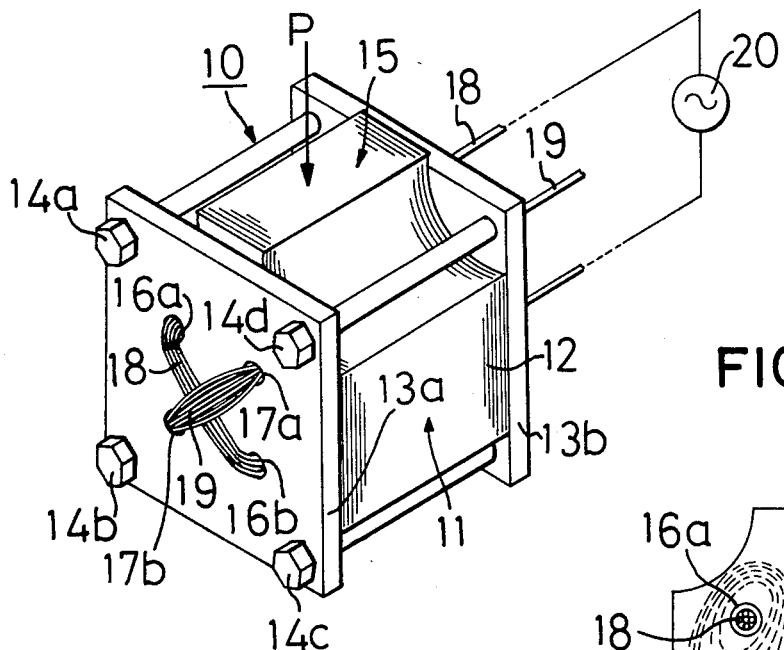
FIG. 1 is a perspective view of a mechanical stress detecting device to be produced in a method according to the present invention.
Figure 2:
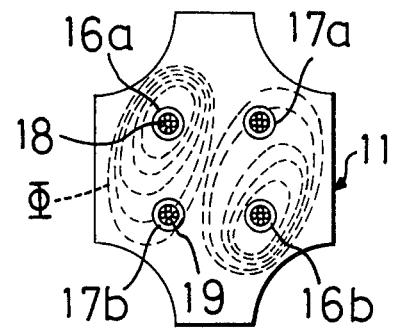
FIG. 2 is a side elevation of a block of magnetic plates forming part of the device shown in FIG. 1.

Reference is now made to the drawings, more specifically to FIGS. 1 and 2 which show the device which is to be produced in the method according to the present invention.

As illustrated, the device, designated generally by reference numeral 10, includes an integral block 11 of a plurality of closely laminated magnetic plates 12 of contoured configuration. The magnetic plates 12 are herein shown to have inboardly curved corners. A pair of substantially identical side plates 13a, 13b of usually non-magnetic material are securely mounted on both sides of the block 11 of the magnetic plates 12 by means of suitable rigid fastening means such as bolts 14a, 14b, 14c, 14d as shown. The block 11 of the magnetic plates 12 and the side plates 13a, 13b attached thereto thus form an integral magnetic core which is generally represented by reference numeral 15 in FIG. 4.

Figure 4:
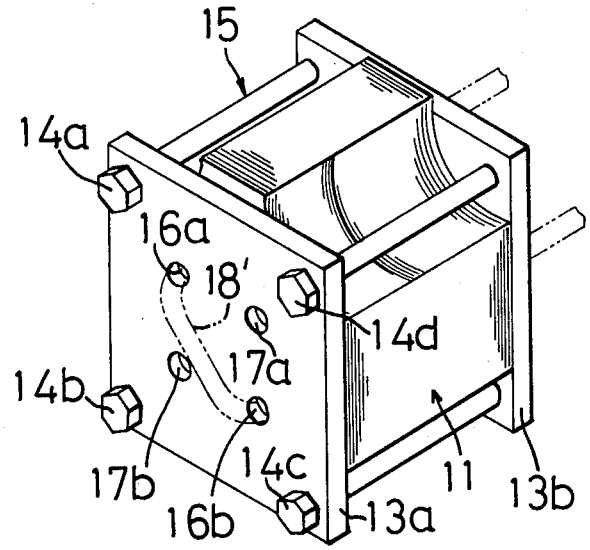
FIG. 4 is a perspective view showing a magnetic core forming part of the device shown in FIG. 1.

The magnetic core 15 thus formed has four apertures 16a, 16b and 17a, 17b which extend through the block 11 of the laminated magnetic plates 12 and the side plates 13a, 13b in a direction which is perpendicular to the magnetic core as best seen in FIG. 4. The apertures 16a, 16b and 17a, 17b are symmetrically spaced from each other at an angle of about 90° and are disposed in such a manner that the lines connecting the diametrically opposite pairs of the apertures are angled at about 45° to the direction in which a mechanical stress or load P is applied to the magnetic core 15 as indicated by an arrowhead in FIG. 1. Two separate coils 18, 19 are passed through the respective diametrically opposite pairs of the apertures 16a, 16b and 17a, 17b. More specifically, an exciting coil 18 is passed through the apertures 16a, 16b and a stress detecting coil 19 is passed through the apertures 17a and 17b. The exciting and stress detecting coils 18 and 19, respectively, thus cross each other on the outer surface of the side plate 13a at an angle of about 45° to the direction of the mechanical stress or load P. The mechanical stress detecting device 10 according to the present invention is thus made up of the magnetic core 15 comprising the block 11 of the closely laminated magnetic plates 12 and the side plates 13a, 13b secured to the block 11. The magnetic core 15 herein used has a monoaxial magneto-anistropy which is established by field cooling with a magnetizing coil energized as will be discussed in more detail. The exciting and stress detecting coils 18 and 19, respectively are positioned in such a manner that the exciting coil lies in a plane which is similar to the plane in which the magnetizing coil lay during the field cooling process while the stress detecting coil lies in a plane which is substantially normal to the plane in which the exciting coil lies. Designated by reference numeral 20 is a source of an ac electric power, which is connected to the magnetizing coil 18 to energize same.

Figure 3:
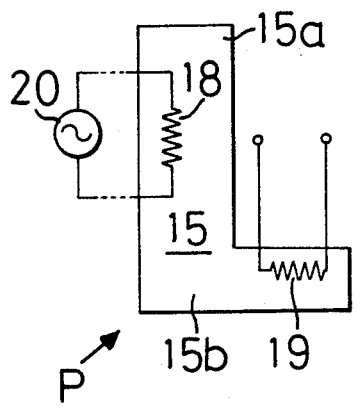
FIG. 3 is a schematic view showing an equivalent electric circuit of the device illustrated in FIG. 1.

An equivalent electric circuit of the device constructed as shown in FIG. 1 is illustrated in FIG. 3, wherein the L-shaped section 15 corresponds to the magnetic core 15 which has a monoaxial magneto-anisotropy established through cooling the magnetic core 15 in a magnetic field. The vertically elongated portion 15a of this L-shaped section 15 corresponds to the plane in which the exciting coil 18 lies, viz., the plane in which the magnetizing coil lay during the field cooling process. The magnetic characteristics resulting from this particular plane is indicated by a hysteresis loop a of FIG. 6 which shows variations in a magnetomotive force H in terms of an ideal flux density B. The horizontally elongated portion 15b of the L-shaped section 15 shown in FIG. 3, on the other hand, is indicative of the plane in which the stress detecting coil 19 lies, viz., the plane substantially normal to the plane in which the magnetizing coil lay during the field cooling process of the method according to the present invention. The magnetic characteristics resulting from this particular plane are isoperm characteristics as indicated by a hysteresis loop b of FIG. 6.

The mechanical stress detecting device which has thus far been described in detail is produced in the method according to the present invention in the following manner. A plurality of magnetic plates 12 are first laminated upon one another, each of which magnetic plates has formed therein four apertures 16a, 16b and 17a and 17b which are symmetrically spaced from each other at an angle of about 90° and disposed in such a manner that the lines connecting the diametrically opposite pairs of apertures are angled at about 45° to the direction of the mechanical stress to be applied to the magnetic plates 12, as previously discussed. The side plates 13a and 13b are rigidly attached to both sides of the resultant block 11 of the laminated magnetic plates 12 by the aid of the bolts 14a, 14b, 14c, 14d thereby to form the integral magnetic core 15.

Figure 5:
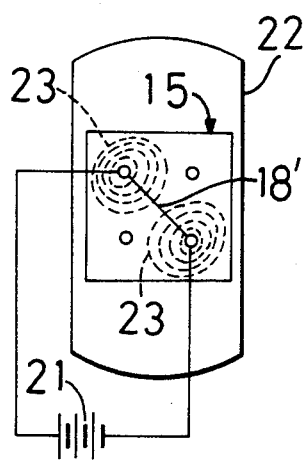
FIG. 5 is a schematic view showing the conditions in which the magnetic core shown in FIG. 4 is being cooled in a magnetic field in the process of carrying out the method according to the present invention.

A magnetizing coil 18' is then passed through the diametrically opposite pair of apertures 16a and 16b and is connected to a dc power 21, as schematically illustrated in FIG. 5. The magnetic core 15 thus having the magnetizing coil 18' is now placed in a heating oven 22 which is filled with a reductive atmosphere such as hydrogen gas. The magnetizing coil 18' is then energized from the dc power source 22 with a predetermined demagnetizing current which is independent from the thickness of the magnetic core 15, while slowly reducing the temperature in the heating oven 22 from about 600° C through the region of about 250° C at the rate of about 10° C per hour. The resultant magnetic core 15 is now provided with a monoaxial magnetic anisotropy. This magnetic core 15 is removed from the heating oven 22, whereupon the magnetizing coil 18' is removed from the magnetic core 15. The exciting coil 18 is now passed through the apertures 16a, 16b on the same plane of coiling as that of the magnetizing coil 18', while the stress detecting coil 19 is passed through the other diametrically opposite pair of apertures 17a, 17b.

In the method for producing the device in accordance with the present invention, the magnetic core 15 is annealed when being cooled in the magnetic field and the internal mechanical distorsion of the magnetic core is removed and the plastic deformation of the integrally combined elements of the magnetic core is caused to add to the rigidity of the core. In the process of cooling the magnetic core 15 in the magnetic field, a monoaxial magneto-anistropy develops along the closed magnetic circuits 23 in the magnetic plates 12 forming the magnetic core, as illustrated in FIG. 5. The monoaxial magneto-anistropy is fixed in the magnetic core 15 as the magnetic core is cooled down. When, therefore, the magnetic core 15 is placed on use at a normal temperature, an easy magnetization axis is established only in a direction parallel to the closed magnetic circuits 23 so that the magnetic core 15 is capable of sensitively responding to an application thereto of a mechanical stress or load.

Figure 6:
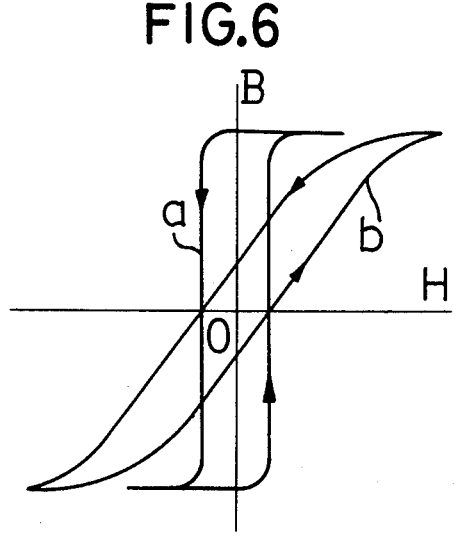
FIG. 6 is a graphic view showing dc magnetization characteristics curves of the magnetic plate produced in the cooling process of FIG. 5.

FIG. 6 illustrates hysteresis loops of the magnetomotive force H relative to an ideal flux density B, wherein the loop a indicates magnetizing characteristics of the exciting coil 18 and the loop b indicates the magnetizing characteristics of the stress detecting coil 19 having the plane of coiling which is perpendicular to the plane of coiling of the exciting coil 18. It will thus be appreciated that the cooling of the closely laminated magnetic plates in the magnetic field established by the closed magnetic circuits is advantageous because the cooling effect is not influenced by the demagnetizing field and, consequently that the cooling in the magnetic field can be carried out without respect to the thickness of the magnetic core 15 so as to permit the use of a relatively low magnetizing current.

Figure 7:
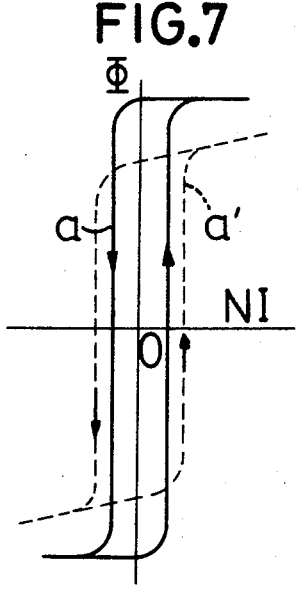
FIG. 7 is also a graphic view showing the variation in the magnetization characteristics of the magnetic plate caused by application of a mechanical stress to the magnetic plate.

When, in the device according to the present invention, the exciting coil 18 is energized from the ac power source 20 with a stabilized ac voltage of a square or sinusoidal waveform and a mechanical stress is applied to the magnetic core 15, the magnetizing characteristics of the ampere-turns NI with respect to the magnetic flux $\phi$ shifts from the square hysteresis loop a of FIG. 7 (which corresponds to the hysteresis loop a of FIG. 6) to the square hysteresis loop a' of FIG. 7 indicated by a dotted curve. Since, however, the saturability characteristics are practically not impaired, the magnetic core 15 can be used satisfactorily as a saturable reactor as will be discussed later. When, moreover, a stabilized ac voltage having a square or sinusoidal waveform is applied to the exciting coil 18 of the device according to the present invention, the quantity of the flux interlinking the detecting coil 19 during application of a mechanical stress to the magnetic core 15 is far greater than that available in a device using a magnetic core which is magnetically non-directive or mechanically distorsionless or which has irregular domain distribution. The detecting device according to the present invention is, therefore, capable of providing a high apparent magneto-strictive sensitivity which is reflected by an increased output voltage to be delivered from the stress detecting coil 19. This means that an improved stress detecting device is provided by the present invention which reduces the load to be applied to the operating electric circuit to be used in connection with the detecting device and which provides an increased signal-to-noise ratio.

When, in operation, exciting coil 18 is excited from the ac power source 20 with a stabilized ac voltage having a sinusoidal or square waveform and the mechanical stress to be measured is applied to the magnetic core 15 in the direction of the arrowhead in FIG. 1, then the flux $\phi$ induced by the current flowing through the magnetizing coil 18 is subjected to a distorsion and consequently caused to intersect with the stress detecting coil 19 so that a voltage proportional to the applied mechanical stress is produced by the stress detecting coil 19. The mechanical stress can be measured from the voltage thus obtained.

Figure 8:
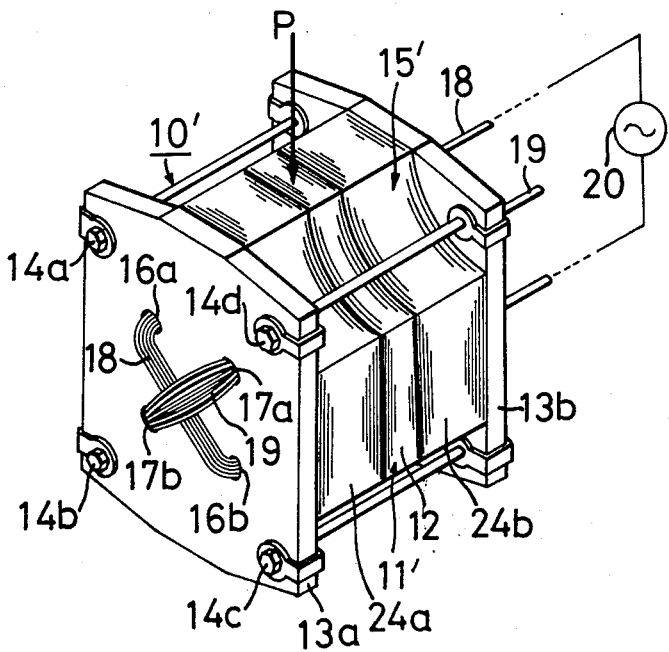
FIG. 8 is similar to FIG. 1 but now illustrates a modified form of the device shown in FIG. 1.

FIG. 8 now illustrates a modified form of the stress detecting device which is produced in accordance with the present invention. The modified mechanical stress detecting device 10' includes an integral block 11' comprising a plurality of closely laminated magnetic plates 12 and a pair of load-sharing members 24a and 24b each of which is made up of a plurality of laminated plates of a non-magnetic material and which are mounted on both sides of the laminated magnetic plates. A pair of side plates 13a, are securely mounted on both sides of the thus constructed block 11 by means of bolts 14a, 14b, 14c, 14d as illustrated. The block 11' of the laminated magnetic plates 12 and the load-sharing members 24a and 24b thus form an integral magnetic core 15'.

The magnetic core 15' thus constructed has four apertures 16a, 16b and 17a, 17b which extend through the block 11' of the laminated magnetic plates 12 and the load-sharing members 24a and 24b in the direction of thickness of the magnetic core 15'. The apertures 16a, 16b and 17a, 17b are symmetrically spaced from each other at an angle of about 90° and are disposed in such a manner that the lines connecting the diametrically opposite two pairs of the apertures are angled at about 45° to the direction of the load P to be applied to the magnetic core 15' as indicated by an arrowhead in FIG. 8. An exciting coil 18 is passed through one diametrically opposite pair of the apertures 16a, 16b and a stress detecting coil 19 is passed through the other diametrically opposite pair of the apertures 17a, 17b. The exciting and detecting coils 18 and 19, respectively, thus cross each other on the outer surface of the side plate 13a at an angle of about 45° to the direction of the load P. The modified mechanical stress detecting device shown in FIG. 8 is thus essentially similar to the device shown in FIG. 1 except for the provision of the load-sharing members 24a and 24b and, as such, the modified device has an equivalent electric circuit which is common to the circuit shown in FIG. 3. Furthermore, the magnetic core 15' of the modified stress detecting device has a monoaxial magnetic anisotropy which is attained by cooling the magnetic core in a magnetic field, similarly to the device shown in FIG. 1.

The device shown in FIG. 8 is, according to the present invention, produced in the following manner. A plurality of magnetic plates 12 are first laminated upon each other, and the load-sharing members 24a, 24b are attached to both sides of the laminated magnetic plates 12 so as to form an integral block 11'. The side plates 13a and 13b are then mounted securely on both sides of the thus constructed block 11' by means of the bolts 14a, 14b, 14c, 14d, thereby constituting an integral magnetic core 15'. The magnetic core 15' has formed therein four apertures 16a, 16b and 17a, 17b which are disposed in a manner previously discussed.

A magnetizing coil 18' is passed through the diametrically opposite pair of the apertures 16a, 16b and is connected to a dc power source 21 as schematically illustrated in FIG. 4. The magnetic core 15' thus provided with the magnetizing coil 18' is placed in a heating oven 22 which is filled with a suitable reductive atmosphere such as hydrogen gas. The magnetizing coil 18' is then energized from the dc power source 21 with a predetermined magnetizing current which is independent from the thickness of the magnetic core 15', while reducing the temperature in the heating oven 22 through a region of about 250° C from about 600° C preferably at the rate of about 10° C per hour. The resultant magnetic core 15' has a monoaxial magnetic anisotropy. The magnetic core 15' is now removed from the heating oven 22, whereupon the magnetizing coil 18' is removed from the magnetic core 15'. The exciting coil 18 is then passed through the apertures 16a, 16b and thereafter the stress detecting coil 19 is passed through the apertures 17a, 17b. It is apparent that the device shown in FIG. 8 is capable of detecting as a voltage signal a considerably great mechanical stress or pressure similarly to the device shown in FIG. 1.

For the measurement of a great mechanical stress or pressure, it is generally required to use a magnetic core having a rigidity corresponding to the magnitude of such a great mechanical stress. To provide the magnetic core with desired characteristics as previously discussed, furthermore, the material to be usable as the magnetic core is necessarily limited to a costly material such as for example a 63 percent Permalloy. The use of such a costly material in a large quantity is apparently objectionable from the economical point of view.

The provision of the load-sharing members 24a and 24b as in the embodiment shown in FIG. 8 is advantageous in this particular respect because only a limited number of magnetic plates 12 is used in combination with less costly non-magnetic plates forming the load-sharing members 24a and 24b. The material usable as the non-magnetic plates may be stainless steel containing 18 percent chrome and 8 percent nickel which is commercially readily available at a low cost. The number of the component plates of the load-sharing members may be selected in dependence with the magnitude of the load to be applied to the magnetic core. The load-sharing members 24a, 24b serve not only to reduce the production cost of the magnetic core but to carry a portion of the load applied to the magnetic core so as to permit of the quantitative detection of an increased mechanical stress or pressure. In this instance, the load-sharing members 24a, 24b may be said to act as a "shunt" in an electric instrument. For the measurement of a load of the order of 1 ton, an appropriate number of non-magnetic plates may be combined into the members 24a and 24b and for the measurement of a load of 10 tons, a correspondingly increased number of the non-magnetic plates may be used. Although, in this instance, the same voltage may be produced without regard to the difference between the numbers of the non-magnetic plates which are used in the two detecting devices, the amounts of the loads measured will be exactly determined by properly graduating the measuring scale or through appropriate conversion of the output voltages with use of suitable parameters. Provision of the load-sharing members 24a and 24b is, in this manner, conductive not only to reducing the production cost of the magnetic core but to standardization of the detecting device for the loads to be detected.

Figure 9:
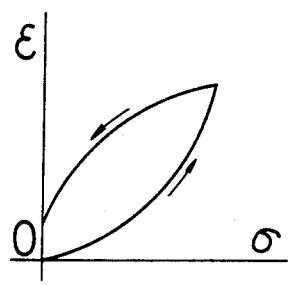
FIG. 9 is a graphic view showing a mechanical hysteresis loop of an elongation varying in terms of a mechanical stress.
Figure 10:
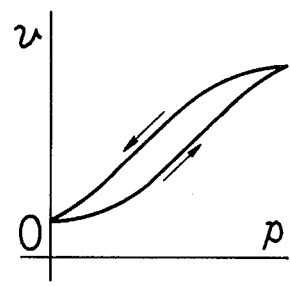
FIG. 10 is a graphic view showing an electrical hysteresis loop of an electric output varying in terms of a mechanical stress.

To save the load to be directly imparted to the laminated magnetic plates 12, it may be also advantageous to have the upper and lower ends of the side plates 13a, 13b flush with the upper and lower surfaces, respectively, of the block 11', if desired, as illustrated in FIG. 8. The side plates 13a, 13b being configured in this manner, the load to be measured is shared not only by the block 11' but by the side plates 13a, 13b so as to reduce the load to be imparted to the laminated magnetic plates 12. This is also advantageous because the mechanical and constructional hysteresis resulting from the load cycles, viz., the hysteresis $\epsilon$ in terms of the mechanical stress $\sigma$ as shown in FIG. 9 and accordingly the electrical hysteresis in the output voltage $v$ in terms of the load $p$ as shown in FIG. 10 can be avoided. Unless, therefore, the upper and lower ends of the side plates 13a, 13b are flush with the upper and lower surfaces, respectively, of the block 11', then the side plates may not be functionally completely integral with the magnetic core 11' with the result that an unusual shearing stress may be built up between the side plates 13a, 13b and the block 11' of the laminated magnetic plates 12 and the load-sharing members 24a, 24b even though the load cycles are limited within the presumed limit of elasticity. Such unusual shearing stress will cause a frictional heat between the side plates 13a, 13b and the block 11', resulting in the mechanical and electrical hystereses as above mentioned.

The stress detecting device constructed as shown in FIGS. 1 and 8 and providing the hereinbefore discussed outstanding features may find applications in various fields of the industry for the purpose of measuring various weights, pressures and other mechanical stresses, although examples of such practical applications of the device are not herein described.

What I claim is:

1. A method for producing a device for quantitatively detecting a mechanical stress comprising the steps of laminating a plurality of magnetic plates upon each other into an integral block, securely mounting a pair of side plates to both sides of said block by means of fastening means for forming an integral magnetic core, said core having formed therein four apertures extending through said magnetic core in a direction substantially perpendicular to said plates and spaced apart symmetrically from each other at an angle of about 90°, said apertures being disposed to have phantom lines interconnecting respective diametrically opposite pairs of the apertures angled at about 45° to the direction in which a mechanical stress to be detected is applied to said magnetic core while in use, passing a magnetizing coil through one of said pairs of the apertures, said magnetizing coil being connected to a dc power source, placing the resultant magnetic core in a hot atmosphere, reducing the temperature of said atmosphere through a predetermined range and at a predetermined rate while energizing said magnetizing coil from said dc power source for establishing a monoaxial magnetic anisotropy in said magnetic core, removing the magnetic core from said atmosphere, removing said magnetizing coil from said magnetic core, passing an exciting coil through said one of said pairs of the apertures, and passing a detecting coil through the other of said pairs of the apertures.

2. A method for producing a device for quantitatively detecting a mechanical stress comprising the steps of laminating a plurality of magnetic plates upon each other, mounting a pair of load-sharing members on both sides of said plurality of magnetic plates for forming an integral block, each of said load-sharing members being made up of a plurality of laminated non-magnetic plates, securely mounting a pair of side plates on both sides of said block by means of fastening means for forming an integral magnetic core, said magnetic core having formed therein four apertures extending through said core in a direction substantially perpendicular to said plates and spaced apart symmetrically from each other at an angle of about 90°, said apertures being disposed to have phantom lines inter-connecting respective diametrically opposite pairs of the apertures angled at an angle of about 45° to the direction in which a mechanical stress to be detected is applied to said magnetic core while in use, passing a magnetizing coil through one of said pairs of the apertures, said magnetizing coil being connected to a source of dc power, placing the resultant magnetic core in a hot atmosphere, reducing the temperature of said atmosphere through a predetermined range and at a predetermined rate while energizing said magnetizing coil from said source of dc power for establishing a monoaxial magnetic anisotropy in said magnetic core, removing the magnetic core from said atmosphere, removing said magnetizing coil from the magnetic core, passing an exciting coil through said one of said pairs of the apertures and passing a detecting coil through the other of said pairs of the apertures.

3. A method as claimed in claim 1, wherein said atmosphere is heated to the vicinity of the Curie temperature.

* * * * *